Aug. 7, 1923.
J. H. STEPHENSMEIER
DIRIGIBLE HEADLIGHT
Filed Aug. 24, 1922
1,464,252
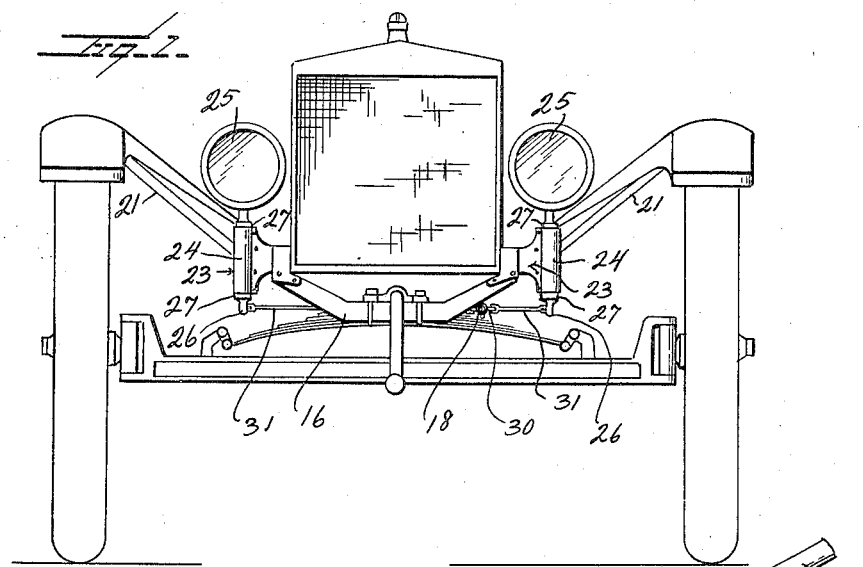
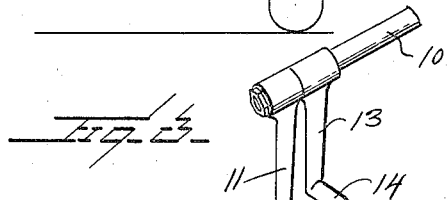
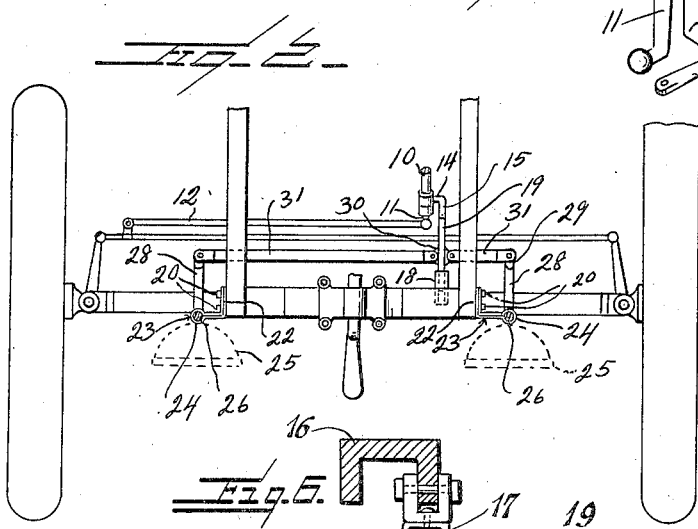
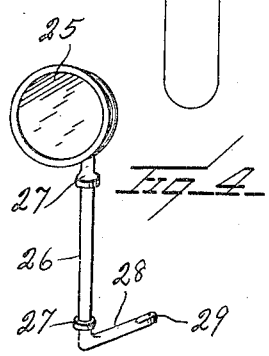
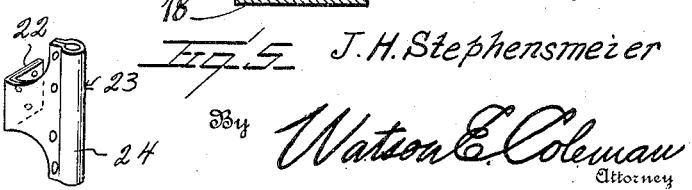
Inventor
J. H. Stephensmeier
By Watson E. Coleman
Attorney Patented Aug. 7, 1923.

1,464,252

UNITED STATES PATENT OFFICE.

JOHN H. STEPHENSMEIER, OF ST. LOUIS, MISSOURI.

DIRIGIBLE HEADLIGHT.

Application filed August 24, 1922. Serial No. 584,076.

*To all whom it may concern:*

Be it known that I, JOHN H. STEPHENS-MEIER, a citizen of the United States, residing in the city of St. Louis and State of Missouri, have invented certain new and useful Improvements in Dirigible Headlights, of which the following is a specification, reference being had to the accompanying drawings.

This invention relates to dirigible headlights, and more particularly to apparatus whereby the headlights may be readily operated from the steering mechanism of the automobile.

An important object of the invention is to provide a device of this character which may be readily applied to an automobile without in any manner interfering with the present steering mechanism, and which is so constructed and arranged that it not only does not interfere with the operation of the steering mechanism but is in no manner attached to the steering drag links and the like forming a portion of the steering mechanism and which accordingly will not tend to increase the wear of the steering mechanism.

A further object of the invention is to provide a device of this character which may be applied to the vehicle without the necessity of in any manner altering the construction thereof and which is so constructed that during its operation and during travel of the vehicle the connecting sections thereof will not come in contact with and rattle against normal portions of the vehicle.

A still further object of the invention is to provide a device of this character which will be simple in its operation, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a front elevation;

Figure 2 is a plan view partially in section showing the manner of mounting the various parts of the device;

Figure 3 is a perspective view of the lower end of the steering arm showing the operating arm applied thereto;

Figure 4 is a perspective view showing one construction of lamp which may be employed;

Figure 5 is a perspective view of the attaching arm by means of which the lamps are applied to the frame.

Figure 6 is a detailed sectional view showing the mounting of the sleeve upon the cross bar.

Referring now more particularly to the drawings, the numeral 10 indicates the steering shaft of a vehicle operated in the usual manner from the steering wheel (not herein shown). This shaft, as is well known to those familiar with the art, projects downwardly and forwardly through the frame of the vehicle and connects at its lower extremity, through means of an operating arm 11, with the drag link 12 of the steering mechanism through medium of which the steering wheels are operated. In accordance with my invention I apply to the shaft 10 a second shaft 13 which extends downwardly therefrom in substantially the same direction as the normal arm 11 and slightly to the rear thereof. The lower end portion of the arm 13 is provided with an angular portion 14 terminating in a forwardly extending section 15, the end of which lies adjacent to the side of and in spaced relation to the lower end of the arm 11.

The numeral 16 designates a cross bar employed for connecting the front ends of the frame sections of the vehicle, and to this cross bar I pivotally connect, as indicated at 17, a cylinder or tube 18 having its rear end open and directed longitudinally of the car and toward the forward end of the arm 13. Pivotally connected to the extension 15 of the arm 13 is a forwardly extending shaft 19, the forward end of which extends into the bore of the cylinder 18 for a purpose presently to appear. The numeral 20 designates attaching bolts normally employed for attaching to the frame of the vehicle brace bars 21. In accordance with my invention these securing elements 20 are removed and replaced through an angular portion 22 formed upon a lamp arm 23. This lamp arm comprises a single sheet of metal bent centrally to form a vertically directed tubular bearing 24, the end portions of the metal being flattened together and bent to form the angular portion 22 hereinbefore mentioned. The lamps 25 are provided with vertical standards 26, the central portions of which are adapted to rotate in the tubular bearings 24, these standards being provided at the ends of the bearing sections thereof with shoulders 27 of any suitable construction to prevent vertical movement of the standard within the bearing. At their lower ends the standards 26 are provided with rearwardly extending portions 28 which are flattened at their ends, as indicated at 29.

The shaft 19 is provided at opposite sides thereof adjacent its forward end with ears 30, to which ears are pivotally connected links 31, the opposite ends of which are pivotally connected with the rearwardly extending arms 28 of the lamp standards 26. When the vehicle to which the foregoing apparatus is attached is moving ahead in a straight line, and when the steering wheels are directed for such movement, the angular extension 15 of the arm 13 is longitudinally aligned with the pivoted tube 18 and the shaft 19 accordingly extends longitudinally of the vehicle. Upon a turning movement of the shaft 10 to operate the steering wheels, the arm 13, which is rigidly attached to the shaft 10, will be moved together with the arm 11 to one side or the other, dependent upon the direction of turning movement, and this movement will cause the rear end of the arm 19 to be moved to one side. Such movement will be compensated for by the pivotal movement of the tube 18 and the sliding movement of the forward end of the shaft 19 within this tube and the sidewise movement of the shaft 19 through medium of links 31 will be imparted to the arms 28 and through these arms to the standards 26 and finally to the lamps 25, causing the lamps to rotate to direct the beams thereof in the direction of turning movement of the vehicle.

From the foregoing it is believed to be obvious that headlight operating mechanism constructed in accordance with my invention is particularly well adapted for the purpose for which it is intended for the reason that it does not necessitate any material change in the present construction of the vehicle and for the reason that the construction of the same is such that the normal operation of the steering mechanism is not interfered with nor subjected to any undue stress or strain. It will furthermore be obvious that the construction as hereinbefore set forth is capable of some change and modification without departing from the spirit of my invention and I accordingly do not limit myself to such specific structure except as hereinafter claimed.

I claim:

1. In combination with a vehicle embodying a steering shaft, a frame and the usual steering mechanism including an arm secured to and depending from the steering shaft through medium of which the steering mechanism is operated, of a second arm secured to said steering shaft and extending downwardly therefrom and provided with an offset portion extending forwardly and to one side of the first named arm, a tube pivotally connected to a cross bar of the frame forwardly of said steering shaft, a shaft pivotally connected to the extension of the last named arm and having its forward end extending into the bore of said tube, lamp arms carried by the frame, lamp standards rotatably mounted in said arms and having rearwardly extending angular portions formed upon the lower ends thereof, and links pivotally connected to said arms and to said shaft adjacent the forward end thereof.

2. In combination with a vehicle embodying the usual frame, steering post and lamps, said lamps having pivot standards, of lamp arms secured to the frame in which the standards of the lamps are rotatable, rearwardly extending portions formed on the lower ends of the standards, a tube secured to a cross bar of the frame and having its open end directed rearwardly toward said steering post, a shaft having its forward end slidably disposed in the bore of said tube and provided at its sides with ears, links pivotally connecting said ears with the free ends of the rearwardly extending portions of said lamp standards, and means connecting the rear end of said shaft and said steering post whereby oscillation of the steering post causes transverse movement of the rear end of said shaft.

In testimony whereof I hereunto affix my signature.

JOHN H. STEPHENSMEIER.